United States Patent Office
3,256,106
Patented June 14, 1966

3,256,106
SULFUR TREATED ASBESTOS
William H. Dresher, Warwick, N.Y., and Harold F. Reichard, Livingston, N.J., assignors to Union Carbide Corporation, a corporation of New York
No Drawing. Filed Dec. 1, 1964, Ser. No. 415,146
6 Claims. (Cl. 106—288)

This application is a continuation in part of application Serial No. 116,708 filed June 13, 1961, now abandoned.

The present invention relates to novel, sulfur dioxide-treated asbestos having unique and useful properties and a process for producing the same.

Asbestos has been used as a filler material in vinyl tile for a number of years. Many advantages are derived from the use of asbestos fillers in vinyl tile but one of the major disadvantages of its use is the fact that tile-making mixes containing asbestos fillers and vinyl polymer binders will rapidly discolor upon exposure to temperature in excess of about 50° C. for short periods of time. This problem is greatly accentuated when asbestos having an abnormally high surface area is used in the tile mix.

Industry, through extensive research, has developed a host of color-stabilizing additives which may be added to asbestos-containing, vinyl polymer, tile-making mixtures. The additives are added directly to the tile-making mixtures themselves and serve to retard discoloration for a sufficient period of time at elevated temperatures to permit mechanical forming of the tile-making mixture into the proper sized sheets or blankets for ultimate production of various sized final tiles. Certain other thermoplastic resin systems containing asbestos filler discolor upon exposure to elevated temperatures during the mixing step, as for example polystyrene, ethylene copolymers, phenoxy compounds, polypropylene and acrylates. Color stabilizing additives may also be used with these systems.

An object of this invention is to provide an asbestos product characterized by reduced discoloration when used in thermoplastic resin systems processed at elevated temperatures.

Another object is to provide an asbestos product characterized by reduced discoloration in vinyl polymer and copolymer tile-making mixtures processed at elevated temperatures.

A further object is to provide a vinyl polymer and/or copolymer intermediate tile-making mixture containing asbestos filler.

Another object is to provide a process for preparing a novel asbestos product characterized by reduced discoloration when used in thermoplastic resin systems processed at elevated temperatures.

The present novel asbestos product satisfying the aforementioned objects comprises sulfur dioxide-treated dry asbestos essentially having amounts up to about 3.0 weight percent sulfur.

The process for producing sulfur dioxide-treated asbestos comprises contacting naturally occurring dry chrysotile asbestos with gaseous sulfur dioxide at a temperature ranging from about ambient temperature to a temperature below that temperature at which asbestos commences to thermally degrade (550° C.) and for a time sufficient to produce asbestos containing amounts up to about 3.0 weight percent sulfur in chemical combination with the asbestos.

Asbestos treated in accordance with the present process has new properties including the ability to impart greater color stability to tile-making mixtures which are treated at elevated temperatures. This phenomenon alone constitutes a substantial contribution to the art of asbestos tile-making. In addition, this invention, when applied to high surface area asbestos, makes it possible to use this type of asbestos as a substitute for normal, low surface area asbestos in standard vinyl-asbestos tile formulations.

Additional new properties exhibited by the asbestos after treatment by the process taught herein include increased oil adsorption, increase water adsorption, decreased surface area, reduced hydroxyl ion concentration on the surface, and reduced surface reactivity.

One high surface area asbestos for which this invention is especially useful is that found in a deposit near Coalinga, California. This material, being the mineral chrysotile, is identical in mineralogical composition to the chrysotile material mined in various parts of Canada, and which is normally used in vinyl-asbestos tile mixtures. The Coalinga-type asbestos differs from Quebec asbestos in that its surface area is from three to five times that of the Quebec material. The Coalinga-type asbestos would be classified between grade 5 and grade 7 according to the Canadian standards classification, but has a much more uniform distribution of individual fiber lengths and diameters than do comparable grades of Canadian chrysotile asbestos. This invention is not limited to chrysotile asbestos derived from any particular natural deposit but is applicable to any asbestos which gives abnormal discoloration when compounded in thermoplastic resin systems at elevated temperature, as for example a vinyl-asbestos tile formulation. It is recognized that the surface area of commercially employed chrysotile asbestos is a function of the amount of mechanical processing to which the asbestos has been subjected as well as the origin of the asbestos. Hence, even asbestos from the deposits in Quebec, Canada, if it has received excessive mechanical working during its processing may be benefited by the present invention.

Chrysotile asbestos in its natural habitat is known to occur in at least two distinctly different forms. One form is cross-fibered asbestos wherein the fibers are substantially parallel and the other is a variety having a matted, randomly arranged fiber. Asbestos to be used in tile-making or as a filler in general, is removed from the natural deposit and subjected to violent hammermill-like treatment to substantially separate the fibers into distinct fibers and/or small bundles of distinct fibers. The final product after hammermill-like treatment is commonly called "opened" asbestos by artisans employed in this field. In the opened form, Coalinga-type chrysotile asbestos may be characterized as having a specific surface area greater than 35 square meters per gram, a water retention greater than 1.7 grams of water per gram of asbestos, and an oil adsorption greater than 0.7 gram of dioctyl phthalate per gram of asbestos.

In accordance with the present invention, the asbestos —either before or after opening—is treated by contacting the dry asbestos with sulfur dioxide gas at a temperature which may range from ambient temperatures up to but slightly below the thermal decomposition temperature of chrysotile asbestos. After a period of time, the length of which is shortened by increased temperature and partial pressures of sulfur dioxide, the asbestos is transformed into a product having up to about 3.0 percent sulfur in chemical combination with the dry asbestos. It appears that about 3.0 weight percent sulfur represents a saturated condition and apparently no more than about 3.0 weight percent sulfur is added to the dry asbestos by superficial treatment under the conditions of the present process.

The following Table I indicates the sulfur content of a single sample of opened, Coalinga-type asbestos after treatment with sulfur dioxide for various lengths of time and at various temperatures.

TABLE I

| Temperature, °C. | Contact Time | Analysis, Wt. Percent S |
| --- | --- | --- |
| Room Temp | 17.0 hours | .72 |
| 60° C | 30.0 min | .80 |
| 550° C | 30.0 min | 1.36 |

Treatment at 60° to 70° C. for 5 to 30 minutes has been found to be adequate for tile-making purposes.

The particular method of contacting the dry asbestos with sulfur-dioxide can be varied and may include any of the commonly known methods of contacting a dry solid with a gas at an elevated temperature. These methods include passing the sulfur dioxide gas across a series of stationary trays containing the asbestos, or passing the gas upwardly or downwardly through asbestos beds on perforated trays. Alternatively the asbestos may be placed in a rotating container and the sulfur dioxide gas passed into the container for contact with the rotating and cascading asbestos. As a further method the asbestos may be placed in a reactor and maintained in a fluidized bed state by the introduction of sufficient sulfur dioxide gas upwardly through the bed. The rotating container and fluidized bed reactor are preferred from the standpoint of intimate contact between the sulfur dioxide gas and the dry asbestos.

In the Table I tests 10-pound batches of Coalinga-type asbestos were charged in a 55-gallon drum mounted horizontally on rotating rollers. The drum was heated by a gas flame mounted beneath, and sulfur dioxide gas was introduced through a rotary joint mounted on the axis of rotation. The gas was charged at a rate of 0.1–1.0 cu. ft. per minute and passed through the rotating, tumbling asbestos. This flow rate provided a large excess over that required to react with the asbestos, and the non-reacted gas was discharged through a rotary joint at the opposite end of the axis of rotation. In commercial operation this excess unreacted sulfur dioxide gas would preferably be recycled to the inlet end for efficient operation.

The sulfur dioxide may be used by itself or as an admixture with air when it is contacted with the dry asbestos. The velocity and the completeness of the reaction will be regulated by the temperature and the partial pressure of the sulfur dioxide in the atmosphere in contact with the dry asbestos. Higher temperatures and sulfur dioxide partial pressures tend to drive the reaction to completion more rapidly.

It is not known whether the sulfur in the dry asbestos after treatment by the aforedescribed process is concentrated on the surface of the asbestos or is diffused throughout the crystalline fiber or both. It is known, however, that the treatment reduces the number of hydroxyl ions which are normally present on the surface of chrysotile asbestos and which undoubtedly take part in the asbestos-organic discoloration reactions involved in vinyl-asbestos tile formulations. The extent of the loss in surface hydroxyl ions is dependent upon the sulfur content of the asbestos.

When the term, "sulfur content," is used herein it should be understood that it is not meant to imply that the product contains elemental sulfur. The exact form in which the sulfur appears in the treated asbestos is not known, except that it is chemically combined with the asbestos. Differential infrared analyses of the sulfur dioxide-treated asbestos when compared with untreated asbestos show the presence of an adsorption band at 9.35 microns which is characteristic of chemically combined sulfur in the form of sulfoxide groups (—S=O). These analyses also do not indicate that the sulfur is present merely as adsorbed sulfur dioxide. Similarly, wet chemical analyses of the product give no indication that the product contains either elemental sulfur or sulfide sulfur.

The chemical analyses of a sample of sulfur dioxide-treated dry Coalinga-type asbestos prepared according to the present invention, and a sample of the same but untreated asbestos are shown in Table II.

TABLE II

| Oxide or Element | Untreated Asbestos, percent | $SO_2$-Treated Asbestos, percent |
| --- | --- | --- |
| MgO | 40.71 | 40.05 |
| $SiO_2$ | 39.74 | 40.05 |
| $Al_2O_3$ | 0.34 | 0.32 |
| $Fe_2O_3$ | 4.77 | 4.69 |
| Combined $H_2O$ | 12.68 | 12.37 |
| Uncombined $H_2O$ | 1.57 | 0.48 |
| S | | 0.54 |

These analyses show that, with the exception of the water content, there is no change in oxides forming the structure of the asbestos. It should also be noted that there is no change in the crystal structure of the bulk chrysotile as a result of this treatment.

Oil adsorption tests were conducted on untreated, Coalinga-type asbestos and sulfur dioxide-treated, opened Coalinga-type asbestos by gradually adding dioctyl phthalate from a graduated burette to a measured weight of asbestos and continuing the addition of dioctyl phthalate until the mixture has mulled and will adhere to a mortar and pestle. The results are shown in Table III.

TABLE III

Asbestos processing:  Dioctyl phthalate adsorbed in milliliters/ten grams of asbestos 1. Opened, Coalinga-type asbestos _____ 7.90
2. Opened, Coalinga-type asbestos but treated with $SO_2$ for 65 hrs. at 23° C. _____ 11.5
3. Opened, Coalinga-type asbestos but treated with $SO_2$ at temperatures up to 70° C. for short periods of time _____ 10.52

Water vapor adsorption tests were conducted by equilibrating both the sulfur dioxide-treated Coalinga-type asbestos and untreated asbestos with atmospheres of various relative humidities. The results of these tests are shown in Table IV.

TABLE IV

| Relative Humidity, percent | Amount of Water Adsorbed (wt. percent) | |
| --- | --- | --- |
| | Untreated Asbestos, percent | $SO_2$-Treated Asbestos, percent |
| 10 | 0.80 | 1.10 |
| 52 | 1.72 | 4.64 |
| 100 | 17.45 | 19.90 |

From the above tables it is readily apparent that sulfur dioxide-treated dry asbestos exhibits a large increase in adsorptive power. This results in a superior bond between the thermoplastic resin and the asbestos filler and improved workability of the mixture so that the energy and time required for mixing is reduced. Also, greater adsorptive power improves formability of the mixture under mechanical working and increased adherence to calendering rolls and differential speed rolls utilized during mechanical forming operations at elevated temperatures.

Surface area tests were conducted by the standard Brunear-Emmett-Teller method wherein the asbestos is first degassed by heating for 16 hours at 225° C. in a vacuum and then contacted with $N_2$ gas at the temperature of liquid $N_2$. The nitrogen gas adsorbed is weighed and surface areas are calculated from the resultant weight of nitrogen gas adsorbed. Table V lists the results of surface area determinations on an opened Coalinga-type asbestos as compared with sulfur dioxide-treated and carbon dioxide-treated, opened asbestos of the same type.

TABLE V

Asbestos treatment: Surface area in sq. m./gm.
1. Opened Coalinga-type asbestos _____ 48.4
2. Opened Coalinga-type asbestos but treated with $SO_2$ for 65 hours at 23° C. _____ 38.0
3. Opened Coalinga-type asbestos but treated for short periods with $SO_2$ at temperatures up to 70° C. _____ 35.6
4. Opened Coalinga-type asbestos but treated with $CO_2$ for a period of 1 hour at 130° C. _ 47.1

From the above data in Table V it is apparent that the sulfur dioxide-treatment has substantially decreased the surface area of the asbestos thereby increasing its color stability in tile-making mixtures. Similar treatment using carbon dioxide gas had no effect on the surface area.

For purposes of comparison, the asbestos samples at 1, 2, and 3 in Table III correspond to the asbestos samples used at 1, 2, and 3 in Table V.

The reduction of the concentration of hydroxyl ions on the surface of the sulfur dioxide-treated Coalinga-type asbestos was measured by the adsorption of methyl red dye from an anhydrous benzene solution. The comparison between the amount of dye adsorbed on the untreated sample and the treated sample is shown in Table VI. These data are also compared with the relative indication of hydroxyl ions on each of the samples as indicated by differential thermal analysis.

TABLE VI

| Measurement | Untreated Asbestos | SO-Treated Asbestos |
| --- | --- | --- |
| Adsorbed Methyl Red, mg./gm. | 25 | 13 |
| Surface OH, Arbitrary Units | 0.082 | 0.061 |
| Sulfur Contents, percent | | 0.54 |

It will be apparent from Table VI that treatment of dry asbestos with sulfur dioxide substantially reduces the hydroxyl ion concentration on the asbestos surface. This reduces the reactivity of asbestos with the thermoplastic constituents of the mixture during elevated temperature processing, hence diminishing the amount of discoloration.

One novel utility of this invention is clearly demonstrated with the sulfur dioxide-treated opened asbestos is used in vinyl-asbestos tile formulations. Moreover, one aspect of the invention is a novel thermally color stable, plastic, intermediate tile-making mixture comprising a copolymer binder of vinyl halide and vinyl acetate constituting between about 10 and 20 weight percent of the mixture, a plasticizer, a pigment, and opened chrysotile asbestos filler constituting between about 5 and 50 weight percent of the mixture which contains about 0.01 to 3.0 weight percent sulfur chemically combined with the asbestos. Standard tile-making procedures require tile-making mixtures which possess color-stability during mechanical forming and working operations at elevated temperatures generally in the range of from about 90° to about 140° C. Since these operations require periods of time ranging up to about 20 to 30 minutes to work the powdered tile-making mix into a coherent form at elevated temperatures and to subsequently roll and form the mixture into a sheet, it is also imperative that the mixtures be thermally color stable over as long a period of time as possible. Also, work stoppages frequently extend the period of time during which the tile-making mixture is exposed to elevated temperatures. Table VII shows the results of reflectance measurements made on tile specimens made from a control mixture No. 1 and two other mixtures Nos. 1-A and 1-B which contained the identical constituents as control mixture No. 1, except that the asbestos component in mixtures Nos. 1-A and 1-B had been sulfur dioxide-treated prior to admixture as follows:

TABLE VII

| Mixture Number | Superficial Treatment With $SO_2$ Gas | |
| --- | --- | --- |
| | Time | Temp., °C. |
| 1-A | 5 minutes | 42.0 |
| 1-B | 1 hour | 135.0 |

The vinyl-asbestos tile mixtures were made up as follows:

Constituents: Percent by weight
Polyvinyl chloride resin _____ 2.35
Polyvinyl acetate resin _____ 13.32
Dioctyl phthalate plasticizer _____ 4.51
Epoxidized soybean oil plasticizer-extender __ .76
Commercial color stabilizer (pentaerythritol) _____ 1.50
Titanium dioxide pigment _____ 3.00
Limestone filler _____ 52.50
Asbestos filler (opened Coalinga-type asbestos) _____ 22.0
                                              99.94

The reflectance of the tile was measured by comparing the diffuse reflectance of 450 millimicron light from the specimen as compared to the diffuse reflectance of the same wavelength light from a smooth magnesium carbonate block in a standard spectrophotometer equipped with a reflectance measuring attachment.

The reflectance is noted as a percent indicating the per cent of 450 millimicron light reflected from the specimen as compared with the white magnesium carbonate standard. As percentage values drop they indicate more adsorption of light and consequently a darker color. Pure white tile in the absence of coloring pigments is desired by the industry. A purple-black color indicates reflectance values well below 20 percent. Table VIII indicates the reflectance of tile specimens prepared from the various mixtures as a function of holding time at 130° C., a temperature comparable to tile rolling temperatures.

TABLE VIII

| Mixture | Reflectance in percent at time in minutes | | | | |
| --- | --- | --- | --- | --- | --- |
| | 0 | 5 | 10 | 20 | 30 |
| No. 1 | 57.0 | 49.0 | 46.0 | 31.0 | 25.0 |
| No. 1-A | 57.0 | 55.0 | 53.0 | 52.0 | 40.0 |
| No. 1-B | 57.0 | 55.0 | 53.0 | 52.0 | 40.0 |

It was found that an increase in sulfur in the opened asbestos filler in the tile-making mixtures caused an increase in the color stability of the total mixture. Optimum stability is achieved in mixtures including known binders and fillers and essentially containing 5 to about 50 weight percent of opened sulfur dioxide-treated asbestos having about 0.4 to 1.0 weight percent sulfur. The sulfur treatment is preferably accomplished by contacting dry asbestos with gaseous $SO_2$ at temperature ranging from about 50° C. up to about 100° C. and for a time ranging from about 5 minutes to about 30 minutes. In addition, the present invention is particularly useful and provides superior color stability to tile-making mixtures containing polyvinyl halides and polyvinyl acetate binders in an amount ranging from about 10 to about 20 weight per cent. Also any of the known plasticizers, pigments, resin extenders and/or stabilizers may be used in the same mixture and the present invention will further enhance the color stability of the same at elevated temperatures.

While only the copolymer of vinyl chloride and vinyl acetate has been described in detail, other copolymers of vinyl acetate and vinyl halides may be used to prepare the intermediate tile-making composition of this invention, as far example vinyl bromide or vinyl fluoride.

Suitable plasticizers include dioctyl phthalate, butyl benzyl phthalate and oxidized soybean oil which usually form 4 to 6 weight percent of the tile-making mixture. The selection of a pigment of course depends on the desired color. Among those useful in the instant mixture are titanium dioxide, phthalocyanine, iron oxide and cadmium yellow. Other color stabilizers which may be used along with the sulfur dioxide gas treatment of the asbestos include polyhydroxyl solid alcohols, heavy metal soaps, urea and benzoic acid derivatives.

Although preferred embodiments of this invention have been described in detail, it should be appreciated that modifications of the product and process are contemplated, all within the scope of the invention.

What is claimed is:

1. A process for producing sulfur-containing chrysotile asbestos comprising the steps of providing naturally occurring dry chrysotile asbestos and contacting same with gaseous sulfur dioxide at temperature ranging from about ambient to temperature below that temperature at which said dry chrysotile asbestos commences to thermally degrade and for time sufficient to produce asbestos containing about 0.01 to 3.0 weight percent sulfur in chemical combination with the asbestos.

2. A process according to claim 1 in which the dry chrysotile asbestos is hammered into distinct opened fibers prior to the contact with gaseous sulfur dioxide.

3. A process according to claim 1 in which the dry chrysotile asbestos is hammered into distinct opened fibers after the contact with gaseous sulfur dioxide.

4. A process for producing sulfur-containing chrysotile asbestos comprising the steps of providing naturally occurring dry chrysotile asbestos and contacting same with gaseous sulfur dioxide at temperature ranging from about 50° C. to about 100° C. and for a time ranging from about 5 minutes to about 30 minutes to produce asbestos containing about 0.01 to 1.0 weight percent sulfur in chemical combination with the asbestos.

5. Sulfur-containing chrysotile asbestos prepared by the process of claim 1 and having smaller surface area, lower hydroxy ion population on the surface, and higher oil and water absorption capacity than said chrysotile asbestos prior to contact with said gaseous sulfur dioxide.

6. Sulfur-containing chrysotile asbestos prepared by the process of claim 4 and having smaller surface area, lower hydroxyl ion population on the surface, and higher oil and water absorption capacity than said chrysotile asbestos prior to contact with said gaseous sulfur dioxide.

References Cited by the Examiner

UNITED STATES PATENTS

| | | | |
|---|---|---|---|
| 112,650 | 3/1871 | Stevens | 23—110 |
| 2,366,400 | 1/1945 | Harrison | 106—288 |
| 2,426,140 | 7/1947 | Bollaert | 106—288 |
| 2,782,179 | 3/1957 | Lontz | 260—41 |
| 2,823,194 | 3/1958 | McKay et al. | 260—41 |

TOBIAS E. LEVOW, *Primary Examiner.*

MORRIS LIEBMAN, *Examiner.*

A. LIEBMAN, S. E. MOTT, *Assistant Examiners.*